United States Patent
Shmueli et al.

(10) Patent No.: US 8,572,085 B2
(45) Date of Patent: Oct. 29, 2013

(54) APPARATUS AND METHOD FOR INCREMENTAL PHYSICAL DATA CLUSTERING

(75) Inventors: Oded Shmueli, Nofit (IL); Lila Shnaiderman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 149 days.

(21) Appl. No.: 12/989,664

(22) PCT Filed: May 19, 2009

(86) PCT No.: PCT/IL2009/000496
§ 371 (c)(1),
(2), (4) Date: Oct. 26, 2010

(87) PCT Pub. No.: WO2009/141818
PCT Pub. Date: Nov. 26, 2009

(65) Prior Publication Data
US 2011/0208737 A1    Aug. 25, 2011

Related U.S. Application Data

(60) Provisional application No. 61/054,249, filed on May 19, 2008, provisional application No. 61/074,311, filed on Jun. 20, 2008.

(51) Int. Cl.
*G06F 17/30*    (2006.01)

(52) U.S. Cl.
USPC .......................................... 707/737; 707/797

(58) Field of Classification Search
USPC .................................. 707/737, 797
See application file for complete search history.

(56) References Cited

U.S. PATENT DOCUMENTS

| 6,026,474 | A | 2/2000 | Carter et al. |
| 7,251,663 | B1 | 7/2007 | Smith |
| 7,689,577 | B2 * | 3/2010 | Thelen .................. 707/999.101 |
| 7,877,722 | B2 | 1/2011 | Duffy et al. |
| 2002/0016891 | A1 | 2/2002 | Noel et al. |
| 2005/0102256 | A1 * | 5/2005 | Bordawekar et al. ............. 707/1 |

FOREIGN PATENT DOCUMENTS

WO    WO 2009/141818    11/2009

OTHER PUBLICATIONS

International Preliminary Report on Patentability Dated Dec. 2, 2010 From the International Bureau of WIPO Re. Application No. PCT/IL2009/000496.
International Preliminary Report on Patentability Dated Jan. 6, 2011 From the International Bureau of WIPO Re. Application No. PCT/IL2009/000609.

(Continued)

*Primary Examiner* — Etienne Leroux
*Assistant Examiner* — Cindy Nguyen

(57) ABSTRACT

In a data storage and retrieval system wherein data arranged in nodes is stored and retrieved in pages, each page comprising a cluster of nodes, a method comprising: monitoring ongoing data retrieval to find retrieval patterns of nodes which are retrieved together and to identify changes in said retrieval patterns over time; and periodically reclustering the data nodes among said pages dynamically during usage of the data to reflect said changes, so that nodes more often retrieved together are migrated to cluster together and nodes more often required separately are migrated to cluster separately, thereby to keep small an overall number of page accesses of said data storage and retrieval system during data retrieval despite dynamic changes in patterns of data retrieval.

18 Claims, 10 Drawing Sheets

(56) References Cited

OTHER PUBLICATIONS

International Search Report and the Written Opinion Dated Nov. 3, 2009 From the International Searching Authority Re.: Application No. PCT/IL2009/000609.

International Search Report and the Written Opinion Dated Oct. 16, 2009 From the International Searching Authority Re.: Application No. PCT/IL2009/000496.

Beyer et al. "System RX: One Part Relational, One Part XML", Proceedings of the 2005 ACM Sigmond International Conference of Management of Data, Baltimore, MD, USA, [Online], XP002547054, p. 347-358, Jun. 14-16, 2005. Retrieved From the Internet on Sep. 23, 2009. p. 347-351.

McIver Jr. et al. "Self-Adaptive, On-Line Reclustering of Complex Object Data", ACM Sigmod Record, [Online], XP002547042, 23(2):407-418, Jun. 1994. Retrieved From the Internet on Sep. 23, 2009.

Shekhar et al. "CCAM: A Connectivity-Clustered Access Method for Networks and Network Computations", IEEE Translactions and Knowledge and Data Engineering. XP002547026, 9(1): 102-119, Jan.-Feb. 1997, Retrieved From the Internet on Sep. 23, 2009.

Shnaideman et al. "PIXSAR: Incremental Reclustering of Augmented CML Trees", Proceedings of the 10th ACM Workshop on Web Information and Data Management, [Online], XP002547064, p. 17-24, Oct. 30, 2008. Retrieved From the Internet on Sep. 23, 2009. & EDBT/ICDT 2009 Joint Conference, St. Petersburg, Russia, Mar. 23-Jun. 26, 2009, XP002547927, p. 17-24, 2009, Retrieved From the Internet on Sep. 23, 2009.

Yang "Data Clustering for Automatic Application Replication", Master of Science Thesis, Department of Computer Science Vrije Universiteit, Amsterdam, NL., XP002547060, [Online], p. 1-58, Aug. 2005. Retrieved From the Internet on Sep. 23, 2009. p. 1-29, 46-51.

Offical Action Dated Aug. 15, 2012 From the US Patent and Trademark Office Re. U.S. Appl. No. 13/000,022.

Official Action Dated Jan. 30, 2013 From the US Patent and Trademark Office Re. U.S. Appl. No. 13/000,022.

\* cited by examiner (a) Before reclustering (triggering part).

(b) After reclustering.

Saxon log:

/a/b'/c

-1 *

0 *

1 *

2

3 *

4 *

5

(a) XML Tree (T)

(b) Clustering Tree (T')

(c) Partition for W=20

(d) Partition for W=25

APPARATUS AND METHOD FOR INCREMENTAL PHYSICAL DATA CLUSTERING

RELATED APPLICATIONS

This Application is a National Phase of PCT Patent Application No. PCT/IL2009/000496 having International filing date of May 19, 2009, which claims the benefit of U.S. Provisional Patent Application Nos. 61/074,311 filed on Jun. 20, 2008; and 61/054,249 filed on May 19, 2008. The contents of the above Applications are all incorporated herein by reference.

FIELD AND BACKGROUND OF THE INVENTION

The present invention relates to a data storage system such as a hard disk that stores database-type data in pages, to incremental physical data clustering to such pages, and, more particularly, but not exclusively to such clustering in native XML databases and other repository systems that store XML documents using a native format.

Current database or repository systems use two main approaches for storing XML documents. The first approach maps an XML document to a relational table where each row represents an edge in the document's XML tree. Existing relational operators are used for traversing over XML stored documents. The second approach, native XML Storage, views the XML document as a tree. The entire XML tree is partitioned into distinct records containing disjoint connected subtrees. These records are stored on disk pages, either in an unparsed, textual form, or using some internal representation.

In native XML Database systems, document processing is dominated by path-dependent navigational XPath queries which are aided by path indices that reduce the number of navigation steps across stored XML records. Thus, disk-resident XPath processors employ a mixed, i.e., part navigational, part indexed, processing model. Therefore, smart clustering of related data items is beneficial. Here, two document nodes are related if they are connected via an edge, and examining one of them is likely to soon lead to examining the other. Data clustering has been shown to be beneficial for hierarchical databases such as IBM's IMS, and for object-oriented databases (OODBs).

A practical algorithm, called XC, clusters XML documents using a tree partitioning approach. XC uses XML (which usually means XPath) navigational behavior, as recorded as edge weights, to direct its document partitioning. XC is based on Lukes' tree partitioning algorithm (see below), but in contrast to Lukes' algorithm, which is an exact algorithm, XC is an approximate algorithm. That is XC trades off partitioning precision for time and space. This enables XC to exhibit linear-time behavior without significant degradation in partitioning quality over the exact optimal solution. However, performing clustering based on navigational behavior as encoded in the parent-child edge weights is not sufficient. It misses the fact that often children of a parent are accessed successively. This means that to reduce the number of page faults, affinity among siblings nodes should also be taken into account.

XS, an extended version of the XC algorithm clusters an XML document taking into account navigational affinity among the sibling nodes. Kanne and Moerkotte also present algorithms for partitioning XML documents by using sibling edges. However, their algorithms do not take workload information into account.

Many data repository systems have evolving workload and access patterns. Consider for example, a data repository that contains tour information. The access pattern to such data changes during the course of the year. In the winter, information about ski vacations is more relevant than information about trek vacations, while in the summer most people will look for seashore/lakeside vacation rather than for a ski vacation. A spa vacation by contrast is probably attractive year round.

In fact, the workload of an XML document may change significantly during operation. This leads to changes in navigation behavior which necessitates data rearrangement. We therefore need a system that is able to adjust the document data placement to changing access patterns while maintaining data placement quality. This has to be done efficiently in terms of both time and space.

The naive solution of full reclustering, upon each change in access pattern, is impractical as it requires reading and clustering the entire document, and these are complex and slow operations.

SUMMARY OF THE INVENTION

The present embodiments provide an algorithm that incrementally modifies data placement as the access pattern changes is preferable. It can operate when the data is lightly accessed, or with a suitable concurrency mechanism, even while the data is being accessed.

According to one aspect of the present invention, in a data storage and retrieval system wherein data arranged in nodes is stored and retrieved in pages, each page comprising a collection of nodes, there is provided, a method comprising:

monitoring ongoing data retrieval to find retrieval patterns of nodes which are retrieved in temporal proximity and to identify changes in the retrieval patterns over time; and periodically rearranging the data nodes among the pages dynamically during usage of the data to reflect the changes, so that nodes more often retrieved in temporal proximity are migrated to cluster together and nodes more often required in temporal separation are migrated to cluster separately, thereby to keep small an overall number of page accesses of the data storage and retrieval system during data retrieval despite dynamic changes in patterns of data retrieval.

In an embodiment, the monitoring comprises:
defining edges between pairs of nodes;
assigning weightings to the edges and incrementing the weighting when respective nodes are retrieved together within the temporal proximity.

In an embodiment, the periodically rearranging is triggered at individual pages.

In an embodiment, the periodically rearranging is triggered for individual pages where weightings have changed beyond a threshold amount, thereby providing identified pages; and rearranging nodes in pages within a radius of the identified pages within the data storage and retrieval system by rearranging nodes in the pages so as to maximize edge weightings within the pages and minimize weightings between the pages.

In an embodiment, the edges comprise internal edges and external edges, internal edges being edges between two nodes currently belonging to the same page and external edges being edges between two nodes currently belonging to different pages, the method comprising triggering the rearranging when one or more external edges obtain a relative increase in weighting, or when one or more internal edges obtain a relative decrease in weighting.

An embodiment may comprise providing the following counters for pages to facilitate operation:

IIC—an Internal Incremental weight Counter,
EIC—an External Incremental weight Counter,
IPC—an Internal Preliminary weight Counter,
EPC—an External Preliminary weight Counter,
GPC—a Global Preliminary weight Counter sampled at two different times to give a first $GPC_{OLD}$ value and a second later $GPC_{NEW}$ value, and
TRF—a predetermined Triggering Rearranging Factor; and
using the counters to trigger rearrangement when either:
the sum of IIC+IPC as a proportion of $GPC_{NEW}$ is smaller by at least TRF in comparison to IPC as a proportion of $GPC_{OLD}$; or
the sum of EIC+EPC as a proportion of $GPC_{NEW}$ is bigger by at least TRF in comparison to EPC as a proportion of $GPC_{OLD}$.

The counters may be embedded within the pages.

The method may be carried out concurrently with data access.

In an embodiment, the data arranged in nodes comprises an XML file arranged as a tree with an XML root being the tree root and further comprising edges between adjacent sibling nodes.

The method may comprise adjusting the sensitivity of dynamic rearranging by changing the value of TRF.

In an embodiment, two nodes are considered for arranging together if their size is such that they are able to fit together on a single page.

According to a second aspect of the present invention there is provided a data storage and retrieval system wherein data arranged in nodes is stored and retrieved in pages, each page comprising a plurality of nodes, the system comprising:

a monitoring unit configured for monitoring ongoing data retrieval to find retrieval patterns of nodes which are retrieved in temporal proximity and to identify changes in the retrieval patterns over time; and a node rearranging unit for periodically rearranging the data nodes among the pages dynamically during usage of the data to reflect the changes in data usage so that nodes more often retrieved together in temporal proximity are migrated to cluster on shared pages and nodes more often required separately are migrated towards separate pages, thereby to keep small an overall number of page accesses during data retrieval despite dynamic changes in patterns of data retrieval.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. This refers in particular to tasks involving the control of the spectral equipment.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1A:
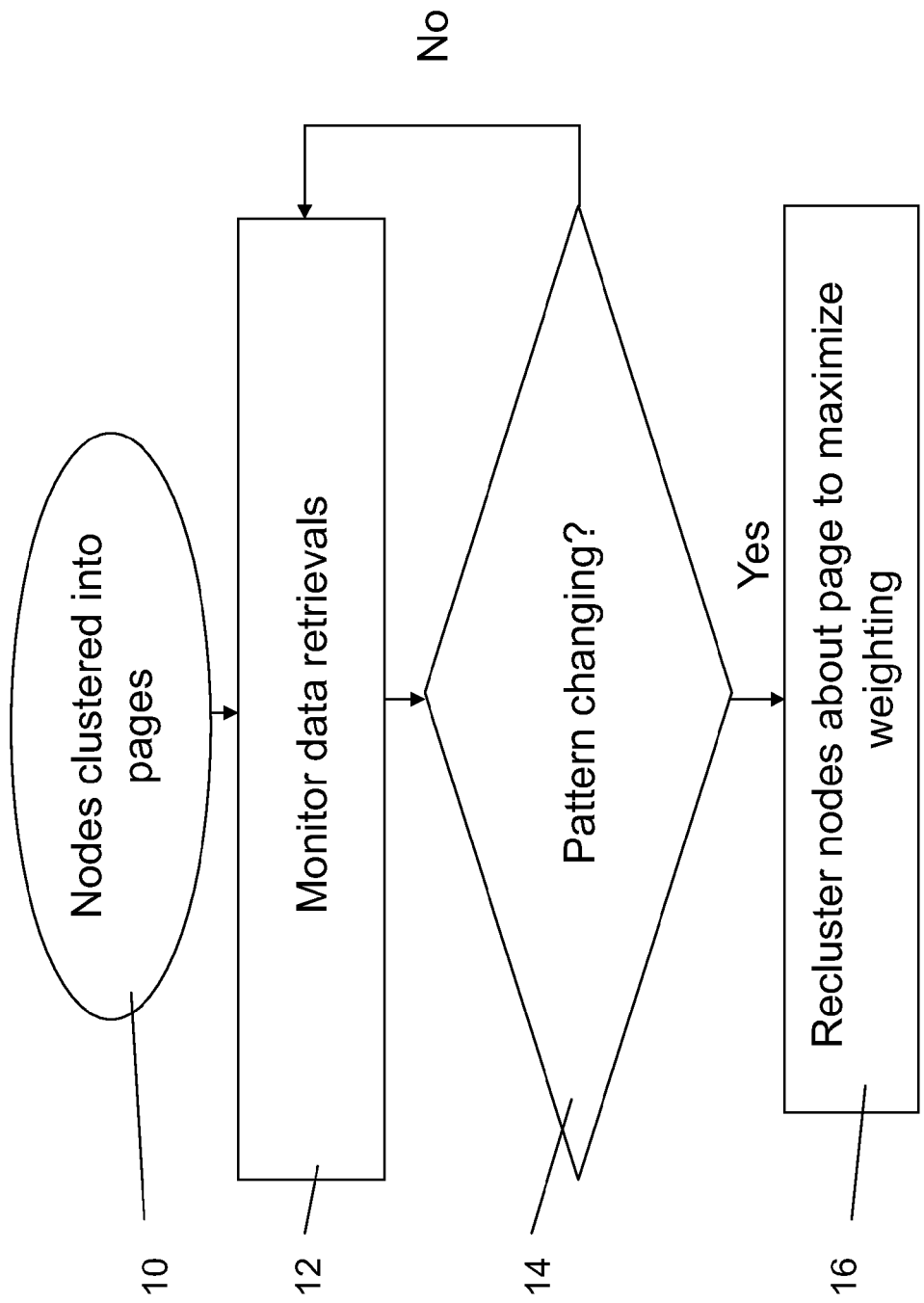
FIG. 1A is a simplified flow chart illustrating a first procedure for dynamically reclustering paged data following changes in usage patterns according to the present embodiments.

The present invention relates to a data storage system such as a hard disk that stores database-type data in pages, to incremental physical data clustering to such pages, and, more particularly, but not exclusively to such clustering in native XML databases and other repository systems that store XML documents using a native format.

The present embodiments provide a way of incrementally modifying the clustering of nodes into pages as the workload, or data access pattern, changes over time.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1A which is a simplified flow chart illustrating dynamic reclustering of nodes based on changes in usage pattern over time. In a data storage and retrieval system data is arranged in nodes, and the nodes are stored and retrieved in pages, so that each page is made up of a cluster of nodes. The data begins already clustered in some way—stage 10.

In stage 12, monitoring is carried out of ongoing data retrieval to find retrieval patterns of nodes which are retrieved together and in particular to identify changes in retrieval patterns over time. Thus two nodes A and B may initially be retrieved together frequently, but as time goes on node B is retrieved less and less, and node A begins to be retrieved more frequently with another node C. The monitoring of stage 12 may identify such a change in decision box 14.

In stage 16, periodic reclustering of the data nodes among the pages is carried out dynamically during usage of the data to reflect the changes, so that nodes more often retrieved together are migrated to cluster together and nodes more often required separately are migrated to cluster separately. Thus in the above example, initially nodes A and B are clustered together on the same page, but as time goes on node A migrates away from B and towards C as the clustering is updated. The idea is that the number of page retrievals is kept to a minimum since different data nodes that are needed together tend to be on the same pages, and remain so even though data usage changes over time.

Figure 1B:
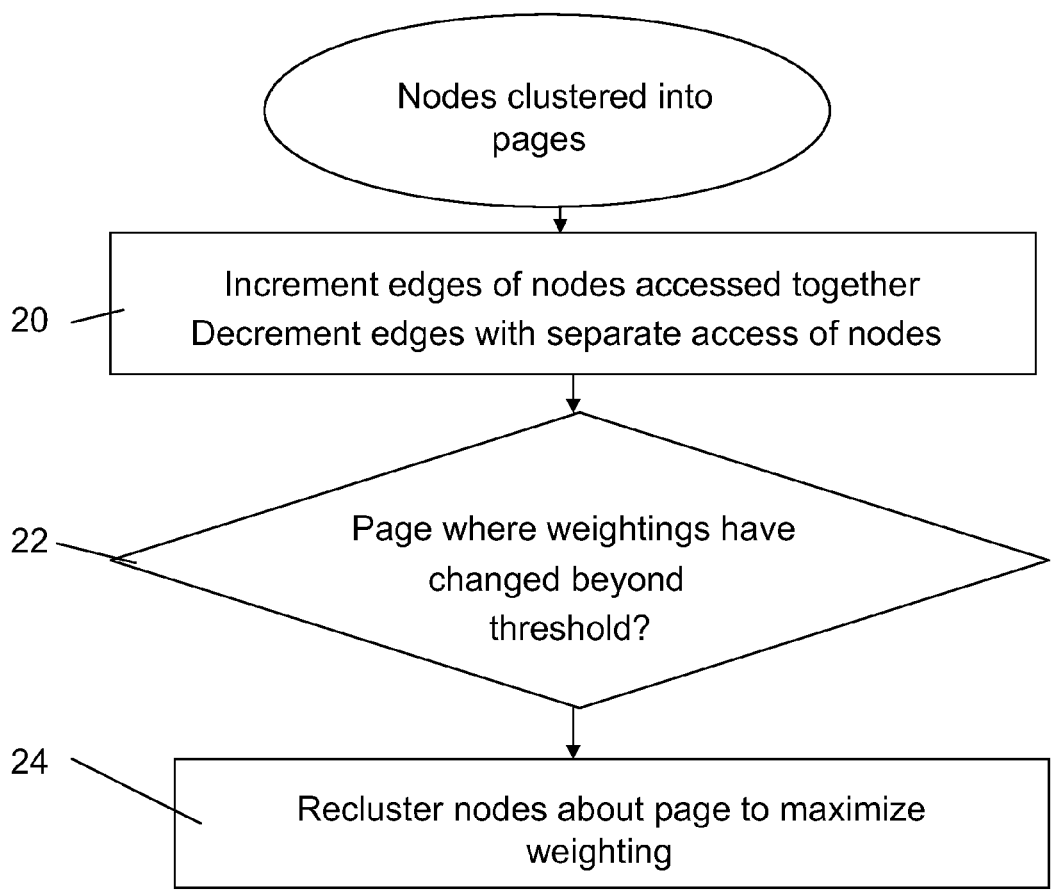
FIG. 1B is a simplified flow chart illustrating implementation details for the procedure of FIG. 1A.

Reference is now made to FIG. 1B which shows an implementation of the method of FIG. 1.

As before the data as arranged as nodes clustered into pages. Data retrieval is per page.

Edges are defined between the nodes, so that each pair of nodes has an edge. Each edge is given a weighting. In box 20 an edge has its weighting incremented when the two nodes associated with the edge are retrieved together, whether directly or within a predetermined proximity. Likewise the weighting may be decremented when one of the nodes is retrieved individually, that is without the other node.

Changes in weightings may be viewed per page to trigger reclustering to involve a particular page and its vicinity. Thus in stage 22, pages are identified where weightings have changed beyond a preset threshold for nodes contained therein.

The pages may be identified by summing the incrementing and decrementing over the pages, say using accumulation counters as will be described in greater detail below. At predetermined intervals the monitoring may check where weightings have changed beyond a threshold amount and reclustering is triggered.

Stage 24 indicates reclustering within a radius of the triggered page of the nodes by migrating the nodes whose weightings have changed so as to maximize weightings within the pages and minimize weightings between the pages The edges may be divided into internal edges and external edges. Internal edges are edges between two nodes currently sharing a page and external edges are edges between two nodes currently on different pages. Triggering of reclustering may be caused when an external edge obtains a relative increase in weighting, or when an internal edge obtains a relative decrease in weighting.

The following counters may be embedded into the pages:

IIC—an Internal Incremental Counter,
EIC—an External Incremental Counter,
IPC—an Internal Preliminary Counter,
EPC—an External Preliminary Counter,
GPC—a Global Preliminary Counter sampled at two different times to give a first $GPC_{OLD}$ value and a second later $GPC_{NEW}$ value, and
TRF—a predetermined Triggering Reclustering Factor.

The counters may be used to trigger reclustering, for example when either:

the sum of IIC+IPC as a proportion of $GPC_{NEW}$ is smaller by at least TRF in comparison to IPC as a proportion of $GPC_{OLD}$; or the sum of EIC+EPC as a proportion of $GPC_{NEW}$ is bigger by at least TRF in comparison to EPC as a proportion of $GPC_{OLD}$.

As the reclustering is for individual pages and the immediate vicinity, it is generally a sufficiently light load operation that it can be being carried out concurrently with ongoing data access.

The data may be arranged in nodes, and may comprise an XML file arranged as a tree.

In the above it may be possible to adjust the sensitivity of dynamic reclustering by changing the value of TRF.

Figure 1C:
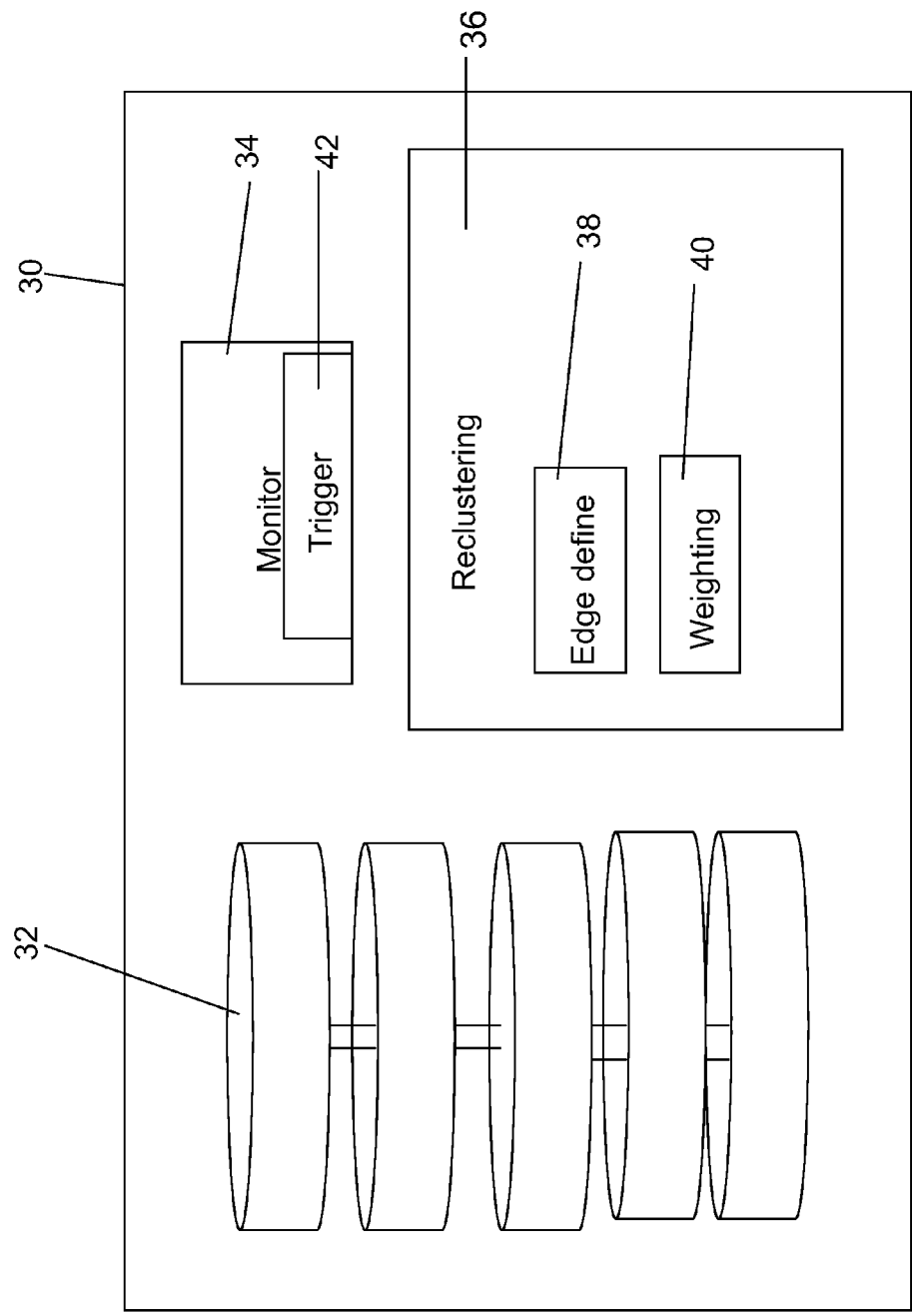
FIG. 1C is a simplified block diagram illustrating a generalized device for carrying out the procedure of FIG. 1A.

Reference is now made to FIG. 1C, which is a simplified block diagram illustrating a data storage and retrieval system 30 wherein data arranged in nodes is stored and retrieved in pages from a memory device 32. Each page comprises multiple nodes, as discussed above.

Monitoring unit 34 monitors ongoing data retrieval to find retrieval patterns of nodes which are retrieved together and to identify changes in the retrieval patterns over time, as discussed. Node reclustering unit 36 then periodically reclusters the data nodes among the pages dynamically to reflect the changes in data usage. The aim is that nodes more often retrieved together are migrated to cluster on shared pages and nodes more often required separately are migrated towards separate pages. Thus the overall number of page accesses needed for data retrieval is kept to a minimum despite dynamic changes in patterns of data retrieval.

The reclustering unit 36 may include an edge definer 38 for defining edges between pairs of nodes, and a weighting unit 40 which assigning weightings to the edges and increments and decrements the weighting according to whether the two nodes joined by the edge are retrieved together or separately.

The monitor may include a reclustering triggering unit 42 for periodically checking for pages where weightings have changed beyond a threshold amount. The triggering unit triggers the reclustering unit to recluster nodes about the triggered pages and as mentioned the reclustering involves migrating the nodes whose weightings have changed so as to maximize weightings within pages and minimize weightings between pages.

In greater detail the following investigates incremental physical data clustering in native XML databases and repository systems that store XML documents using a native format. We formulate the XML clustering problem as an augmented tree partitioning problem with sibling edges and propose the PIXSAR (Practical Incremental XML Sibling Augmented Reclustering) algorithm for incrementally clustering XML documents. The general framework of PIXSAR is that of the XS1 augmented tree partitioning algorithm, which extends the XC partitioning algorithm, which in turn is based on Luke's algorithm. PIXSAR incrementally executes the XS algorithm on selected subgraphs of the global augmented document tree. The subgraphs are implied by changes in the workload.

The main parameters of PIXSAR are the radius, in pages, of the augmented portion to be reclustered and the way reclustering is triggered. We use an end-to-end experimental data clustering system that includes a disk and File System simulator for storing native XML data. We use a novel method for 'exporting' the Saxon query processor into our setting. Experimental results indicate that using PIXSAR significantly reduces the number of page faults incurred while querying the document thereby resulting in improved query performance.

In the following, we present PIXSAR, a practical algorithm for incremental reclustering of XML documents over parent-child and sibling edges. Following an initial clustering, PIXSAR uses XS as a subroutine for performing incremental reclustering of selected portions of the document. The selected portions are the ones that experienced major access pattern changes as compared to the rest of the document.

To provide an implementation of the present embodiments an extensive infrastructure was prepared. It includes a simulated, memory resident, disk and a simple File System to manage the simulated disk. The reason the disk is simulated is merely because of the practicalities of carrying out extensive experimentation.

To allow workload tracking and data reclustering a detailed disk-page format was designed and implemented.

Another issue was how to generate the query workload. The method used is to take an industrial strength XPath query processor, trace its operations on actual XML files and transform the navigational behavior to that of the present setting. In addition, we also took into account the possible use of indexing. On this infrastructure, extensive experimentation on a large combination of relevant parameters was conducted.

PIXSAR views the XML file as an augmented tree with sibling edges. PIXAR exploits the observed XML navigational behavior to direct its incremental partitioning activity. PIXSAR makes decisions on the fly, and selectively reclusters parts of the augmented document tree that experience significant changes in access behavior. The main parameters used by PIXSAR are the radius, i.e., the number of inter-page edges, of the portion to be reclustered, and the sensitivity of reclustering triggering.

A further embodiment provides an end-to-end experimental data clustering system that includes a disk and File System simulator for storing native XML databases, and extensive experimentation of the PIXSAR algorithm within this system.

Another embodiment provides a novel method for simulating an existing query processor in a new environment. We introduce the Saxon-L query processor which mimics the Saxon query processor referred to above.

In the following we present an overview of the XML clustering problem and then the PIXSAR algorithm follows. The experimental platform is described and experiments are then detailed.

XML Clustering

We formulate the XML clustering problem as an augmented tree partitioning problem. The tree to be partitioned is a clustering tree, namely an XML tree with node and edge weights. Roughly, the edge weights model the (usually XPath) navigational behavior. In the model higher edge weights mean that the connected XML nodes are traversed more often in temporal proximity although lower weights could be used to indicate the same thing if desired. Node weights may for example further include the text size (no. of characters) of the XML node as well as various references (parent, sibling, etc.) and weights associated with parent and sibling references (edges). The problem is to partition the set of nodes of the clustering tree into node-disjoint subsets (called clusters) so that each cluster fits into a disk page, and the total of the intra-cluster edges' weights (called the partition's value) is maximized. Intuitively, a higher value partition results in fewer disk accesses Reference is now made to FIG. 2A which shows data in six nodes a-f with weightings across edges between father-daughter nodes and between sibling nodes. The date is clustered into two pages or clusters each of size 3. Cluster 1 has a value of 170 and cluster 2 has a value of 120. the result is a two cluster partition of an augmented tree.

Figure 2A:
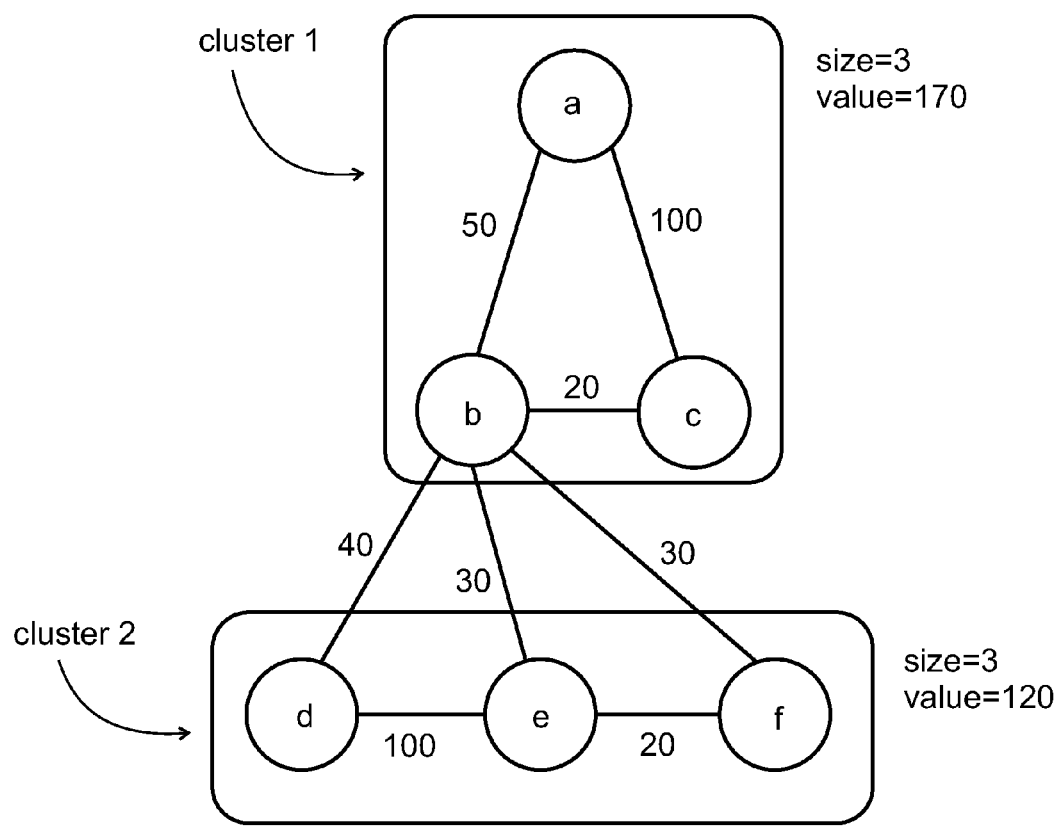
FIG. 2A is a simplified diagram illustrating an augmented tree of nodes clustered into two clusters.

Both XC and XS are dynamic programming algorithms that provide practical approximate solutions to the XML clustering problem. While XC operates on a weighted rooted tree, XS operates on a weighted rooted tree augmented with sibling edges. FIG. 2A is such a partition of an augmented tree consisting of two clusters. Both algorithms compute a partition of the input tree into a set of clusters, which are then stored on disk pages.

The Incremental Reclustering Algorithm

As time progresses, the workload associated with the document may change. The main idea behind the reclustering algorithm is to adjust the document placement on disk, after the initial clustering, to the changed workload, so that the number of page faults is reduced. The trivial solution is to perform a full reclustering each time the workload is changed. But this is inefficient as it requires reading and clustering of the entire document, and these are very complex and slow operations. Our solution opts for incremental reclustering. Rather the present embodiments find areas that are either "underweight" or "overweight" with respect to the rest of the document and recluster these areas.

Incremental Reclustering

The Reclustering Radius determines the pages that are to be reclustered. Intuitively, this parameter reflects the maximum distance of pages that are affected by a change in a page. More formally, it is defined inductively:

Base case: $R_0$, the set of pages that correspond to a 0 reclustering radius which contains only the page on which a significant change occurred.

Inductive step: let $R_{i-1}$ be the set of pages that correspond to a reclustering radius of i−1. Ri is defined as $R_{i-1} \cup$ {page|page contains a node directly connected via an edge to a node located in a page which belongs to $R_i,1$}.

The decision as to whether reclustering is required is based on changes in pages rather than nodes. This is due to space considerations. To this end, each page contains special data items for determining whether reclustering is needed. These special items include initial and incremental counters of internal and external weights associated with the page and the index of the global counter which contains the sum of all edges in the entire augmented tree at some point in time. The global counter is part of an array of global counters. Following each reclustering, the current global counter is added to that array. In case there is no free slot in the global counter array, we conduct a cleaning operation on the array. During this operation, we remove each third global counter. In case the algorithm needs to access a deleted global counter, it uses the global counter with the closest index to the deleted one. The traversal algorithm is described below.

We use two variables in this algorithm. The first is a reclustering flag, which is set as soon as we find that reclustering is needed (it is initially set to off). The second is the reclustering node, which is set to hold the node that caused the reclustering decision.

For each traversed node:

1. If a query is currently being processed, proceed to step 3, otherwise, i.e., about to start a new query, proceed to step 2.

2. If the reclustering flag is off, proceed to step 3, otherwise, perform reclustering of the page in which the reclustering node is located, and of all pages within the reclustering radius. Apply the following steps:

(a) Convert the pages that participate in the reclustering into XS's internal data format.

(b) Run XS on these pages in the internal data format.

(c) Assign each resulting cluster to a page having sufficient space to hold it.

During this assignment, write the current state of the page (internal and external) weights into the initial internal and external counters accordingly. Add the current global counter to the global counters array and write the ID of the current global counter to the relevant place in the page.

3. Update the weight of all edges that connect the currently traversed node with other nodes that are sufficiently close.

4. Update the page's incremental (internal and external) weight counters.

5. Toss a biased coin where the probability of obtaining a "head" is q, a system parameter. If the result is a "tail" continue the traversal at step 1, otherwise, continue to the next step. The motivation is to reduce the number of times in which we check whether reclustering is needed.

6. Check if reclustering is needed—according to the triggering algorithm, as defined below. If reclustering is not needed continue the traversal at step 1.

Otherwise, set the reclustering flag to on and assign the node ID of the currently traversed node to the reclustering node variable. The intuition for this step is to provide an indication of the necessity of a reclustering for step 2.

Incremental Triggering

While traversing the augmented tree, edge weights are modified as described later on. Changes of some edge weights may lower the quality of the partition, and reclustering of some part of the augmented tree is useful.

The triggering algorithm determines when a change of an edge weight may cause reclustering.

An internal edge is an edge connecting two nodes residing in the same disk page. An external edge is an edge connecting two nodes residing on different disk pages.

Intuitively, an edge may cause reclustering when its weight is changed significantly, relatively to all other tree edges. This is because, such a change means that traffic through this edge has significantly increased (or decreased) relative to other edges.

When an edge is an external edge, and the traffic through it is smaller, the value of the partition is relatively improved. In a similar way, when an edge is an internal edge, and the traffic through it becomes larger, the partition value is relatively improved. So, reclustering need be triggered only when an edge is an external edge and the traffic through it shows a relative increase, or when an edge is an internal edge and the traffic through it shows a relative decrease.

The triggering of reclustering is based on changes in pages rather than nodes. It may be simply impractical to track changes at the level of nodes. To formally describe the triggering test, we define the following counters:

IIC—Internal Incremental Counter,
EIC—External Incremental Counter,
IPC—Internal Preliminary Counter,
EPC—External Preliminary Counter,
GPC—Global Preliminary Counter, and
TRF—Triggering Reclustering Factor.

Reclustering triggering occurs when one of the following takes place:

The percent of IIC+IPC out of the new GPC becomes smaller by at least TRF in comparison to the percent of IPC out of the old GPC, i.e.

$$(IIC+IPC)/GPCNEW/(IPC=GPCOLD) < (100,TRF)=100.$$

The percent of EIC+EPC out of the new GPC becomes bigger by at least TRF in comparison to the percent of EPC out of the old GPC, i.e.

$$(EIC+EPC)=GPCNEW=(EPC=GPCOLD) > (100+TRF)=100.$$

Figure 2B:
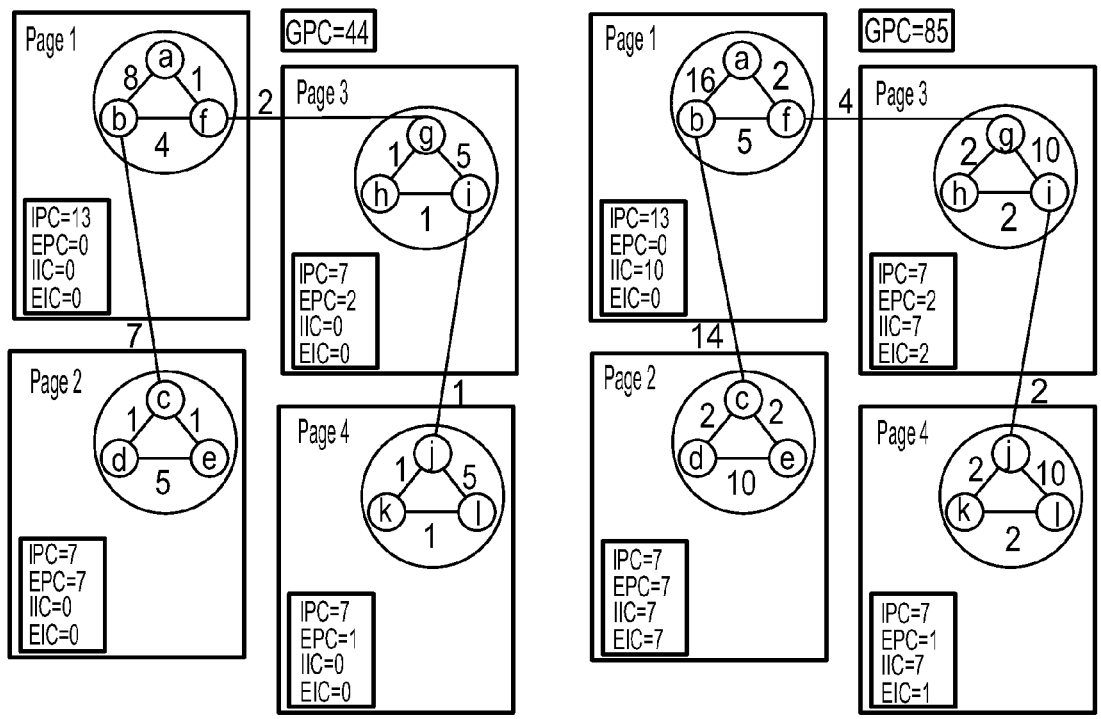
FIG. 2B illustrates a clustering procedure carried out on a tree such as that shown in FIG. 2A, wherein FIG. 2B(a) shows triggering prior to reclustering and FIG. 2B(b) shows the tree after reclustering.
Figure 2B:
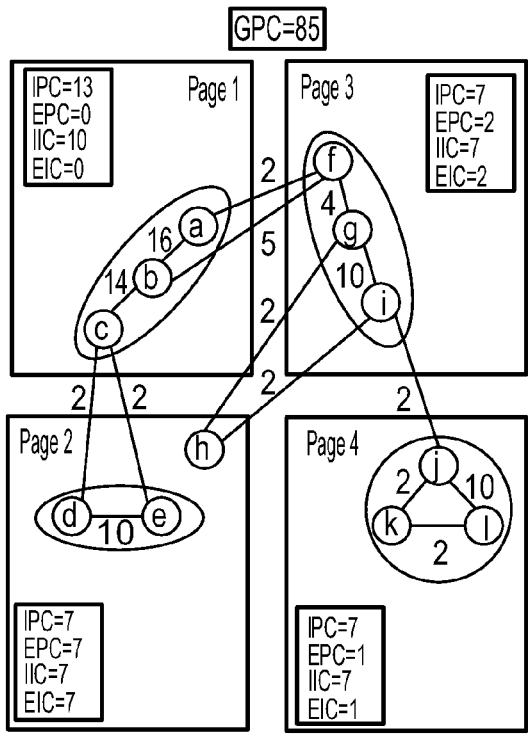

To illustrate the PIXSAR algorithm, we present an example in FIG. 2B. For this example, we define the page size to be 3 (say KB), node size to have a fixed size of 1, TRF to be 2% and Radius as 1. The left side of FIG. 2B(a) shows the disk state after running initial reclustering, and before starting the traversal over the document. We observe that the IPC and EPS counters contain the corresponding initial values, while IIC and EIS are zero, because the traversal has not yet started. The right side of FIG. 2B(a) shows the disk state right after traversing edge (a; f) i.e., while visiting node f. IIC and EIC are updated and contain the difference between the current and the initial values of the edges.

In the next step, we run the triggering test on page 1 (the page in which node f is placed) and discover that the percent of IPC as a proportion of $GPC_{OLD}$ is 30% while IIC+IPC as a proportion of $GPC_{NEW}$ is 27%. Since 27/30=0.90<0:98, triggering occurs. We conclude that reclustering is needed.

The part that is reclustered includes pages 1, 2 and 3. Page 4 does not participate in the reclustering because its distance from page 1 is two steps, which is bigger than the Radius value of 1. FIG. 2B(b) shows the disk state right after the reclustering. Note that IIC and EIC in pages 1 and 2 are still zero, because they have not yet been traversed as of the last reclustering.

Experimental Platform

We now present an experimental platform for evaluating the PIXSAR algorithm. The platform is composed of a disk simulator for storing XML documents, a File System simulator and the Saxon-L simulator which mimics the Saxon XPath query processor.

Disk Simulator

Figure 3:
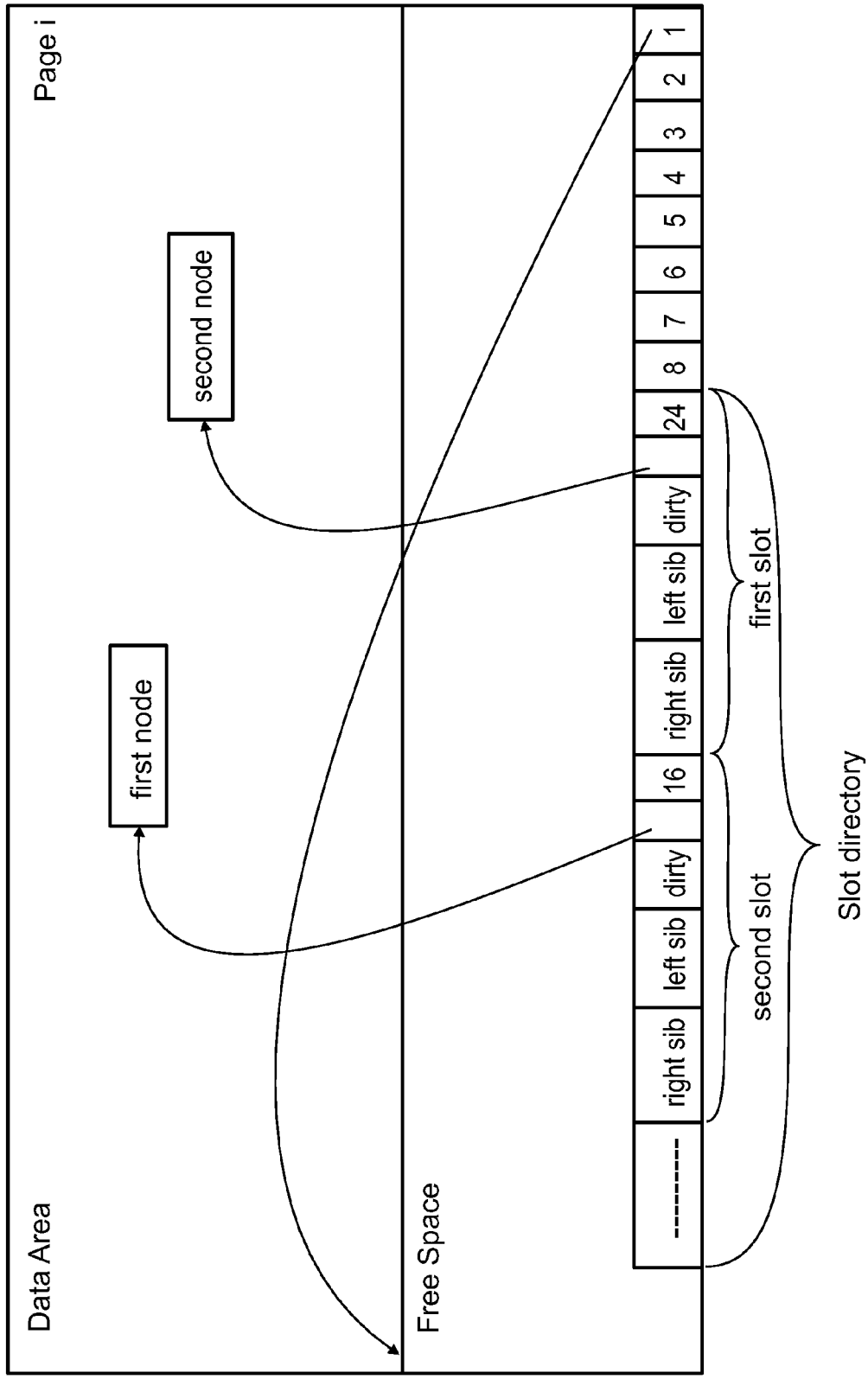
FIG. 3 illustrates a data page with two nodes, free space and embedded management data for use in reclustering according to the present embodiments.

We implement a simple disk simulator which stores and manages XML tree nodes. The disk is implemented as a linear array of pages, as per the discussion hereinbelow. Each page contains a page directory and page data, as illustrated in FIG. 3. The page directory holds the meta information about the current page and is described in Table 1. Page data is composed of node data units that are described in detail in Table 2. The following terms are used in these tables:

Page Internal Weight:

The sum of the weights of all edges with both ends located in the page.

Page External Weight:

The sum of the weights of all edges from nodes in the current page to nodes on other pages.

The disk simulator is constructed so as to facilitate experimentation with the PIXSAR algorithm. For that purpose, we keep the simulated disk data in main memory to expedite the experiments. We abstract out the physical characteristics of the disk, such as arm, platters, rotation, disk cache, etc. by viewing the disk simply as an array of pages. While we lose precision using this simplification, the ranking of results does not significantly change compared with a more detailed simulation.

File System Simulator

A simulator is provided in order to trace disk accesses during run time. We use LRU as the page replacement method. As demanded by the reclustering triggering algorithm, a page may be pinned in main memory. Consequently, we use LRU with the following modifications. The page that is removed, in case a frame for a new page is needed, is the least recently used unpinned page. The removed page is written to disk only if it has been changed since the time that it was read into memory.

TABLE 1

Page Directory.

| Slot Name | Slot Description |
| --- | --- |
| Pointer to empty place | Indicates the beginning of the free space in page. |
| Number of entries in the directory | Indicates the number of nodes stored in the current page. |
| Overflow Pointer | In case that some document node is bigger than a page, the overflow pointer points to a page which is a continuation of the current page. |
| Initial global counter index | This counter holds the sum of the weights of all the augmented tree edges at the time of the last reclustering. |
| Initial internal counter | Holds the sum of the weights of internal page edges at the time of the last reclustering. |
| Initial external counter | Holds the sum of the weights of external page edges at the time of page creation. |
| Incremental internal counter | Holds the sum of weights that was added to the internal page edges during traversals over the page that have been performed since the last reclustering. |
| Incremental external counter | Similar to incremental internal counter. |
| Node Info Entries | Every node in the page has an entry in this page directory. It contains: the node offset which indicates the start address of the node data, node length in bytes, a dirty bit that indicates whether the node info entry can be deleted from the page directory in case that the node is deleted, a left sibling bit that indicates if a left sibling pointer exists, and a right sibling bit. |

SaxonLike XPath Processing

The Saxon-L (Saxon Like) simulator mimics the operations of the Saxon XPath query processor. The main difference between Saxon and Saxon-L is that Saxon stores XML information in relational tables, while Saxon-L uses native XML Storage. Saxon navigates the XML document using the following information:

1. The "next" column of the table ("next" contains the following sibling node and, in case there are no following sibling nodes, "next" returns the parent node).

2. IDs of the nodes which are processed in DFS (depth first search) order.

3. The "parent" column of the relational table.

Saxon-L is a hypothetical query processor for our system which operates in a manner similar to that of Saxon. A log, of nodes that are visited during the execution of the Saxon XPath processor, is created. We "execute" Saxon-L by (hypothetically) using the Saxon traversal algorithm, and mimicking the traversal carried out by Saxon. This is possible as both Saxon and Saxon-L traverse each axis exactly in the same way. Consider, for example, traversing a child axis. Saxon performs it by using the next column.

It obtains the first child (the next node in DFS order) and then iterates over all the following sibling nodes. Saxon-L simply goes over all the children pointers that are located within the node record. Consider, for example, traversing a descendant axis. Saxon considers, in DFS order, all the nodes that have an ID bigger than the ID of the current node and smaller than the ID of the following sibling of the current node. Saxon-L iterates over all the descendants of the current node, in DFS order, by using a recursive function that implements a simple DFS traversal of the augmented tree. This is why the log file, which tracks a node in the augmented tree each time the node is touched by Saxon, records an identical traversal order for both tools: the actual Saxon and the hypothetical Saxon-L. In other words, the recorded execution in the Saxon log is tantamount to the order the hypothetical Saxon-L would have produced.

TABLE 2

Node Data Unit.

| Field name | Field description |
| --- | --- |
| Parent Pointer | A pointer to the parent node of the current node. |
| Edge weight | Weight of the edge between the parent node and the current node. |
| Left sibling pointer | Optional field. In case a left sibling edge exists, this is a pointer to the left sibling node. |
| Left sibling weight | Optional field. In case a left sibling edge exists, this is the weight between the left sibling node and the current node. |
| Right sibling pointer | Similar to left sibling pointer. |
| Right sibling weight | Similar to left sibling weight. |
| Attribute counter | Number of attributes of the current node. Note that every attribute is held in a different node. |
| Children nodes counter | Number of children of the current node. |
| Attribute pointers | List of pointers to attribute nodes. |
| Children pointers | List of pointers to children nodes. |

An important requirement of Saxon-L is that all the ancestors of the current node are placed in an Ancestors Stack and remain there during the time that Saxon-L processes the current node. Thus any node that is placed in the Ancestors Stack is pinned in main memory. Saxon, during processing, makes many passes over children of a node, the node itself and its ancestors. So the usage of the Ancestors Stack reduces the number of page faults because it guarantees that if some node is in main memory, then its ancestors are also in main memory. Saxon-L operates in page mode (rather than node mode) which means that during the time that some node of a page is in the Ancestors Stack, the entire page remains in main memory. This hinges on the assumption that the tree depth of XML documents is usually small (a few tens at most).

Weight Updating Algorithm:

During the traversal over the document tree, we need to update edge weights. An edge weight is a way to quantify the importance of placing two nodes on the same page on disk.

The idea is that if two nodes are temporally traversed "close enough" to each other, we would like them to be located in the same page.

The meaning of "close enough" is as follows. Suppose a node $x_1$ is traversed and then, after traversing nodes $x_2$, $x_3$ to $x_{i-1}$, node $x_i$ is traversed. In case nodes $x_1$, $x_2$ to $x_i$ are small enough to be placed in the same page, we say that $x_1$ and $x_i$ are "close enough". If during the traversal two nodes are found to be "close enough" and there is an edge between them, this edge's value is incremented by one.

As will be mentioned hereinbelow, the augmented tree that is stored in disk is built in such a way that all its edges are unidirectional. This means that for edge (a,b), directed from a to b, there has to be special treatment in the case that during the traversal b is encountered before a. The edges weight quantifying algorithm copes with this minor complication.

Supporting indexes: Indexes contain direct pointers to a set of nodes that correspond to some XPath query expression. When a query expression whose prefix is an indexed expression is processed, no traversal is done for the "indexed" part of the expression—the query processor "jumps" directly to the nodes that are pointed by the index. Consequently, no weight is added to edges which are included in the path that is covered by the index. The (hypothetical) Saxon-L query processor (as opposed to Saxon) utilizes indexes in XPath queries. We implement this feature by inserting a simple modification into the Saxon source code that enables marking the indexed part of the query execution. During the processing of the query, the modified Saxon puts a special mark, in the produced log, near the nodes that are part of the navigation covered by the index. Saxon-L identifies this mark, and does not read the corresponding nodes (and hence no page faults are counted). This way we simulate the direct jump, by Saxon-L, to the indexed nodes.

The weight updating algorithm determines whether nodes are accessed in temporal proximity, in which case storing them on the same disk page is likely to reduce the number of page faults. Note that in case temporal proximity applies, but nodes are connected by neither child-parent edge nor by sibling edge, we are unable to record this property and perhaps more intricate mechanisms are needed. This situation occurs, for example, when using indexes.

Implementation details: Saxon-L is implemented using the following steps:

1. Create the log of Saxon's run for the given XPath queries that form the workload.
2. In the Saxon-L simulator, traverse the augmented document tree by using the log produced in the previous step, and update (during the traversal) the weight of the edges which are not covered by an indexed part, as described above.

In the implementation, Saxon-L holds an Ancestors Stack of the nodes on a path between the root of the document and the currently visited node. Each time that a new node is traversed, the Ancestors Stack and the corresponding edge weight are updated. As was mentioned before, the Ancestor Stack helps in reducing the number of page faults.

Figure 4:
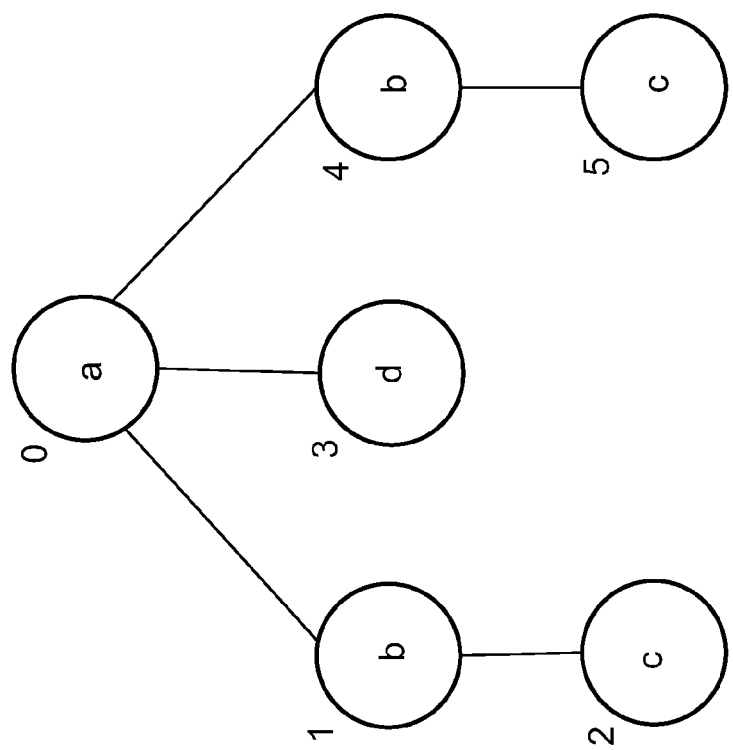
FIG. 4 illustrates a log and a tree of a data traverse through a page.

Reference is now made to FIG. 4 which presents a simple example of a Saxon-L run. In the example we see a simple augmented document tree, and a log of the query /a/b'/c for this tree. The character ' denotes the last step of an indexed part, i.e., an index exists for /a/b. The first column of the document is the DFS ID of the touched node. The Second column indicates whether the current node is part of a path covered by an index. The order of traversal can be determined from the log, i.e., the DFS ID of the first node that is touched is "−1". That is this node is a dummy node that symbolizes the root of the augmented tree—parent of a. The next touched node has DFS id 0 (the id of the real root of the document—the node a), etc. Note that all the nodes that belong to the indexed part /a/b are marked with *. When Saxon-L traverses the document according to this log, it does not read '*' marked nodes from disk. That is, no weight is added to edges (−1, 0), (0, 1), (0, 3) and (0, 4), because the nodes with DFS ID 0, 1, 3 and 4 are covered by the index expression /a/b. The weights of edges (1, 2), (4, 5) are incremented during the traversal.

EXPERIMENTAL EVALUATION

We compared PIXSAR to DFS, a depth-first scan and store scheme. DFS is a natural clustering algorithm that scans an XML document in a depth-first search manner and assigns every encountered node to the currently used disk page. As soon as the current page is full, DFS starts assigning nodes to a new page. A major advantage of DFS is that it places together XML nodes that are neighbors in the document.

Another advantage of DFS is that it is an online single-pass algorithm. DFS uses only parent-child edges, performs only a single initial clustering of the document, and then does not change the storage arrangement.

For experimental purposes, we used the XMark benchmark software to produce XML documents of different sizes. We chose representative XPath queries (based on queries proposed in the XMark project). All experiments were run on a x86-based Linux machine with 3 GB main memory and 250 GB disk space. Our implementations of PIXSAR and DFS employ an incremental reference-counting garbage collector to aggressively detect and collect "dead" objects. We used the number of page faults and the final partition cut value (total of inter-page edge weights) as the main performance metrics. The space overhead for enabling reclustering was not very significant.

Main Parameters

To evaluate the performance of PIXSAR, we experimented with the following parameters:

Document size (DS)—10 MB, 124 MB, 256 MB.

Cache size (CS)—approximately 5% and 10% of file size on disk.

Reclustering radius (RR)—2 and 3. A radius that is bigger than 3 almost always causes total reclustering.

Reclustering page limit (RPL)—a limit on the number of pages that can participate in a reclustering. RPL is chosen to be 1% and 1.5% of the document size in pages.

Reclustering factor (RF)—The magnitude of change to edge weights that triggers reclustering. We used three different factors: 1%, 2% and 3% of change in the value of edge weights counters in the page (see the section on incremental triggering hereinabove).

An additional important parameter is chunk size. Chunk size determines the weight interval used in the PIXSAR algorithm (when invoking the XS algorithm). Chunk size affects both the total execution time and the partition quality, so that a smaller chunk size results in a higher value, or better, partition. The chunk size parameter is dominant for large files. PIXSAR self-tunes this parameter as follows. In case the number of pages participating in reclustering is small, PIXSAR uses a small chunk size, but in case the reclustering portion is large, PIXSAR uses a bigger chunk size.

Experiments Description

Setting Up

An experiment was run with two input files: an XML document, and a log file with queries to be run on the given document.

The structure of this log file is as follows. There is a core composed of different queries which are called the basic log workload. This basic log workload is repeated a number of times. This creates the experimental workload. By using a basic workload that is repeated, the structure of the log roughly models a real-life workload. An experiment begins with loading the input document to the simulated disk. We use the DFS algorithm for the initial data placement on disk.

Initially, every edge in the document has weight 1. All logs were recorded by running the following basic queries, in which PARAM represents a randomly chosen value which was chosen individually per occurrence:

/site/people[position( )=PARAM]/person[position( )=PARAM]/name/text( )
/site/open auctions[position( )=PARAM]/open auction[position( )=PARAM]/bidder[position( )=PARAM]/increase/text( )
/site/open auctions[position( )=PARAM]/open auction[position( )=PARAM]/bidder[last( )]/increase/text( )
/site/open auctions[position( )=PARAM]/open auction[position( )=PARAM]/initial/text( )
/site/closed auctions[position( )=PARAM]/closed auction[position( )=PARAM]/price/text( )
/site/regions/*/item[position( )=PARAM]/*/text( )
/site/people/person[position( )=PARAM]/pro¯le/*/text( )
/site/people/person[position( )=PARAM]//text( )

Experiment Description

Every experiment has two main runs:

Incremental Run—

After loading the document to disk, we traverse the document according to the queries log file. During this traversal, we run the incremental algorithm as described hereinabove, and collect the relevant information (number of page faults and partition values) to result logs. Page faults occurring while reclustering are also counted.

DFS Run—

After loading the document to disk, the document is traversed according to the queries log file. No changes are performed to the document placement on disk during this step. During the traversal (as in the incremental run) we collect the relevant information to result logs.

TABLE 3

Results for a 10 MB document.

| Experiment Parameters | Page Faults | | Cut Value | |
|---|---|---|---|---|
| | Incremental | Impr (%) | Incremental | Impr (%) |
| RR = 2, RPL = 40, CS = 5%, RF = 0.5 | 7,601,344 | 34 | 10,689,604 | 41 |
| RR = 2, RPL = 40, CS = 5%, RF = 1 | 7,406,801 | 35 | 10,009,621 | 44 |
| RR = 2, RPL = 40, CS = 5%, RF = 2 | 6,666,395 | 42 | 9,613,880 | 47 |
| RR = 2, RPL = 40, CS = 10%, RF = 0.5 | 7,580,923 | 34 | 10,689,604 | 41 |
| RR = 2, RPL = 40, CS = 10%, RF = 1 | 7,392,081 | 36 | 10,009,621 | 44 |
| RR = 2, RPL = 40, CS = 10%, RF = 2 | 6,656,719 | 42 | 9,618,147 | 47 |
| RR = 2, RPL = 55, CS = 5%, RF = 0.5 | 6,635,431 | 43 | 8,703,710 | 52 |
| RR = 2, RPL = 55, CS = 5%, RF = 1 | 5,877,116 | 49 | 8,618,986 | 52 |
| RR = 2, RPL = 55, CS = 5%, RF = 2 | 5,529,099 | 52 | 8,706,772 | 52 |
| RR = 2, RPL = 55, CS = 10%, RF = 0.5 | 6,610,763 | 43 | 8,703,710 | 52 |
| RR = 2, RPL = 55, CS = 10%, RF = 1 | 5,860,149 | 49 | 8,618,986 | 52 |
| RR = 2, RPL = 55, CS = 10%, RF = 2 | 5,514,808 | 52 | 8,716,793 | 51 |
| RR = 3, RPL = 55, CS = 10%, RF = 0.5 | 9,834,171 | 15 | 13,733,006 | 23 |
| RR = 3, RPL = 55, CS = 10%, RF = 2 | 9,888,890 | 14 | 14,333,957 | 20 |

In all the experiments, the number of DFS page faults is 11443584, the DFS cut value is 17914194. The Impr columns show percentage improvement of an incremental run in comparison to a DFS run.

TABLE 4

Results for a 124 MB document.

| Experiment Parameters | Page Faults | | Cut Value | |
|---|---|---|---|---|
| | Incremental | Impr (%) | Incremental | Impr (%) |
| RR = 2, RPL = 400, CS = 5%, RF = 1 | 1.01E+08 | 21 | 1.07E+08 | 25 |
| RR = 2, RPL = 400, CS = 5%, RF = 2 | 97,018,960 | 24 | 1.01E+08 | 29 |
| RR = 2, RPL = 400, CS = 5%, RF = 3 | 90,911,738 | 29 | 92,042,233 | 34 |
| RR = 2, RPL = 400, CS = 10%, RF = 1 | 1.01E+08 | 21 | 1.07E+08 | 25 |
| RR = 2, RPL = 400, CS = 10%, RF = 2 | 97,018,960 | 24 | 1.01E+08 | 29 |
| RR = 2, RPL = 400, CS = 10%, RF = 3 | 90,911,738 | 29 | 92,042,233 | 34 |
| RR = 2, RPL = 600, CS = 5%, RF = 1 | 99,897,324 | 22 | 1.07E+08 | 25 |
| RR = 2, RPL = 600, CS = 5%, RF = 2 | 97,532,704 | 24 | 1.02E+08 | 28 |
| RR = 2, RPL = 600, CS = 5%, RF = 3 | 93,394,659 | 27 | 95,063,281 | 33 |
| RR = 2, RPL = 600, CS = 10%, RF = 1 | 99,897,324 | 22 | 1.07E+08 | 25 |
| RR = 2, RPL = 600, CS = 10%, RF = 2 | 97,532,704 | 24 | 1.02E+08 | 28 |
| RR = 2, RPL = 600, CS = 10%, RF = 3 | 93,394,659 | 27 | 95,063,281 | 33 |

In all the experiments, the number of DFS page faults is 1.28E+08, the DFS cut value is 1.42E+08. The Impr columns show percentage improvement of an incremental run in comparison to a DFS run.

In order to easily comprehend the experimental results, we collect the relevant information 300 times during each run. We divide the traversal log into 300 equal parts, and at the end of each such part we log the relevant execution information. For example, if the log length is 30,000 then before starting traversing each sequence of 100 queries, we log information at this point.

Evaluation of the PIXSAR Algorithm

We examine how PIXSAR affects the number of page faults. We run the 10 MB document with a log file size of 40,000 queries, while the basic log workload consists of 1000 queries. The results are presented in Table 3. We observe that for RPL=55, RR=2, and RF=2, PIXSAR reduces the number of page faults by about 50% as compared to DFS. We also note that:

Cache size (in the range checked) has little influence on the results.
A larger RF provides better results.
RPL is a dominant parameter. RPL=55 gives impressive results for RR=2 but very poor results for RR=3.

The reason for the dominance of this parameter is that RPL=55 is too small for RR=3, because the reclustered portion is not inclusive enough, leading to very poor results. Recall that RPL is either 1% or 1.5% of the document size in pages. We ran experiments with a 124 MB document with a log file size of 40,000 queries with basic log workload size of 1000 queries. But, in these experiments, we ran PIXSAR only over the first 30,000 queries. For the last 10,000 queries we performed no reclustering. In these experiments we used the knowledge gained during the 10 MB experiments. So, we excluded RR=3. We experimented with higher RF values to check if our thesis that larger RF values yield better results.

In light of our previous observations, in these experiments we set RR=2 and varied only three parameters: RPL, RF and cache size. The results are presented in Table 4. We note that for RPL=400 and RF=3, PIXSAR provides a 29% improvement. This is especially interesting as we performed reclustering operations only during the first 30,000 queries out of the 40,000 queries. These experiments show that higher RF values provide better results, and that cache size (at the range we checked) does not affect the result.

Figure 5:
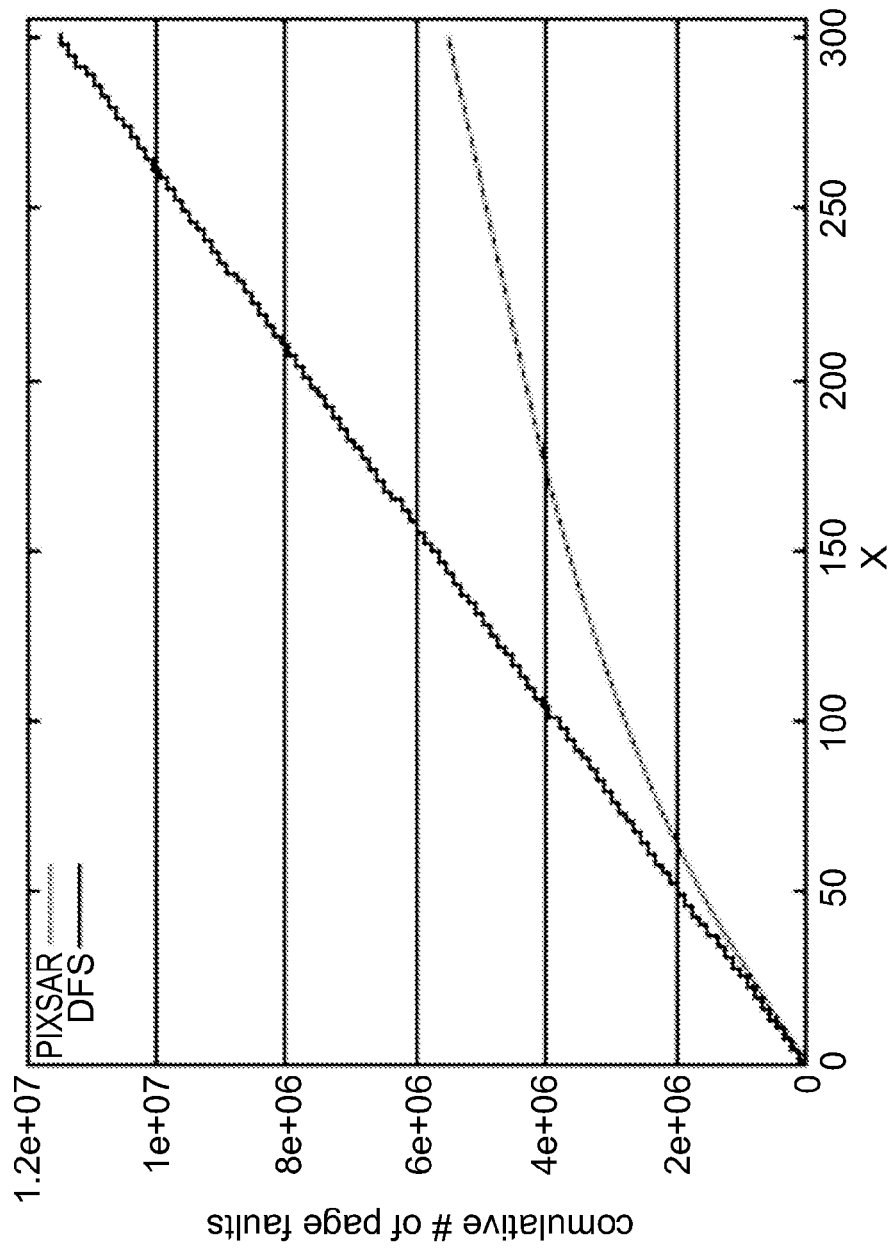
FIGS. 5 and 6 are graphs illustrating experimental results in which PIXSAR is compared with DFS in terms of cumulative page faults.
Figure 6:
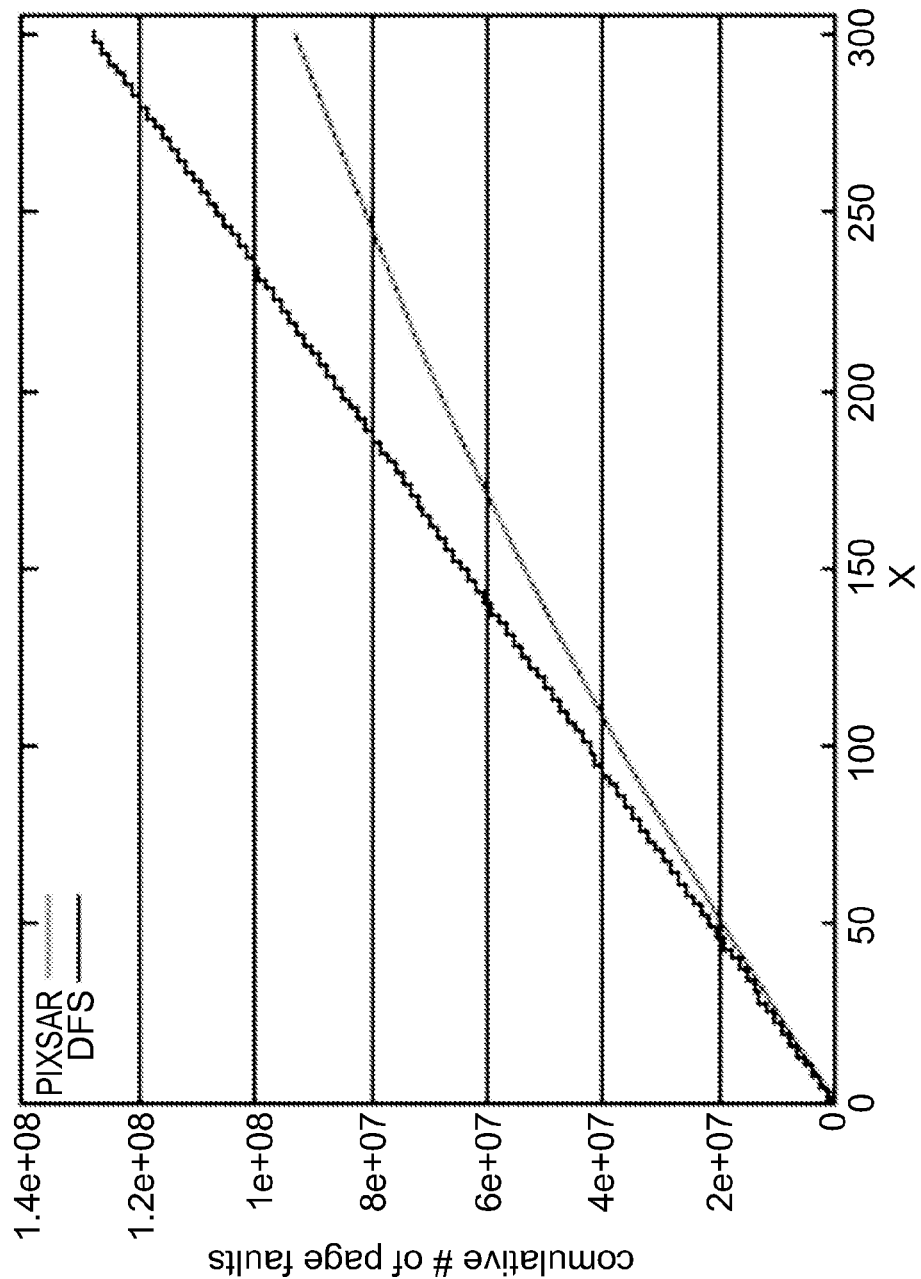

FIGS. 5 and 6 show the behavior of PIXSAR in comparison to DFS in terms of number of page faults. FIG. 5 shows the result of an experiment with RR=2, RF=2, RPL=55 and cache size 5% of hard disk size. We observe that starting from x=170, the slope of the PIXSAR curve stabilizes.

This means that the number of page faults per unit time is fixed for the basic workload and is no longer being reduced by PIXSAR. Intuitively, PIXSAR has learned the new workload.

FIG. 6 shows the result of an experiment with RR=2, RF=3, RPL=400 and cache size 5%. We observe that starting from x=225, the slope of the PIXSAR curve stabilizes. But x=225 is exactly ¾ of the queries log size, i.e., the point after which no reclustering operation is performed. So, it is almost certain that had we continued to perform reclustering operations, the slope of the PIXSAR curve would continue to evolve, which means that the disk placement quality of the document can still be improved.

We ran experiments over a 256 MB document with a log file size of 40,000 queries. The basic log workload size is about 700 queries, this number was chosen because of the enormous sizes of workload log files (generated by Saxon runs).

In these experiments as well, we ran PIXSAR only on the first 30,000 queries. For the last 10,000 queries no reclustering was performed. In these experiments, using the intuition gained in previous experiments, we excluded RR=3 and cache size 5%. We also experimented with RF=4 in order to check whether a large value for RF is beneficial for large files. The results are presented in Table 5. We note that for RPL=1000 and RF=4, PIXSAR provides a 16% improvement. The result is less impressive, probably because the basic workload size and the workload file itself are not large enough. Their sizes were chosen due to limited resources. All the experiments exhibit a high correlation between a low cut value and a low number of page faults.

In the 256 MB experiments, we observe that page fault improvement is about 15% and the cut value improvement is 18% whereas in the 10 MB experiments, the page faults improvement is 35%-50% and the cut value improvement is 40%-50%.

We experimented, over a 10 MB document, with queries that use indexes. Each experiment was run over a different log. Each such log contains repetitions of one indexed query for about 5000 times. Other parameters were fixed to RPL=55, RR=2 and RF=3. The queries used are:

1. /site/open auctions/open auction'[position( )=96]/bidder[1]/increase/text( )

2. /site/open auctions/open auction'/initial/text( )

3. /site/closed auctions/closed auction [position( )=235]/price/text( )

4. /site/regions/*/item'[position( )=60]/*/text( )

Recall that "*" indicates an index usage. The results are presented in Table 6. We observe that in three queries out of four there is an improvement of about 40% in the number of page faults, which is similar to the improvement in queries without using indexes while running with the same values for RPL, RR and RF. For the second query, the improvement is only 4%. This query navigates nearly the whole document. So, smart packing has little impact on performance and it endures additional page faults during reclustering operations. We conclude that for queries that traverse a large portion of the data, PIXSAR improves little or not at all.

We plan to extend PIXSAR so it would be able to pack together indexed nodes that do not have a sibling relation, and are visited in temporal proximity to each other.

In another experiment, we ran PIXSAR on one workload log file and then, after processing 20,000 queries, we changed to a different workload log file. The goal of this experiment was to examine how PIXSAR adjusts to a completely new workload after having fitted storage placement for an initial workload. For this experiment we use two logs with different sizes. One log has 20,000 queries while the basic workload size is 500 queries. The second log has 40,000 queries with a basic workload size of 1000 queries. A first run executed PIXSAR for both logs (concatenated). A second run executed PIXSAR only for the first log and while processing the second log no reclustering operations were performed. The RPL, cache size and RR parameters are fixed and the RF parameter is varied. The results are presented in Table 7.

TABLE 5

Results for a 256 MB document.

| Experiment Parameters | Page Faults | | Cut Value | |
| --- | --- | --- | --- | --- |
| | Incremental | Impr (%) | Incremental | Impr (%) |
| RR = 2, CS = 10%, RPL = 1000, RF = 3 | 2.11E+08 | 14 | 2.28E+08 | 18 |
| RR = 2, CS = 10%, RPL = 1000, RF = 4 | 2.07E+08 | 16 | 2.26E+08 | 18 |
| RR = 2, CS = 10%, RPL = 1500, RF = 3 | 2.11E+08 | 14 | 2.28E+08 | 18 |
| RR = 2, CS = 10%, RPL = 1500, RF = 4 | 2.09E+08 | 15 | 2.28E+08 | 18 |

In all the experiments, the number of DFS faults is 2.46E+08, the DFS cut value is 2.77E+08. The Impr columns show percentage improvement of an incremental run in comparison to a DFS run.

TABLE 6

Results for indexed queries.

| | Page Faults | | |
| --- | --- | --- | --- |
| log | Incremental | DFS | Impr (%) |
| log of 1 | 18,286 | 27111 | 33 |
| log of 2 | 5,185,793 | 5,323,262 | 4 |
| log of 3 | 12,714 | 22,120 | 43 |
| log of 4 | 47,558 | 84,461 | 44 |

The Impr columns show percentage improvement of an incremental run in comparison to a DFS run.

TABLE 7

Results for the "changing workload" experiment.

| RF value | Page Faults | | |
|---|---|---|---|
| | First run | Second run | Impr (%) |
| RF = 2 | 17,256,014 | 24,975,032 | 41 |
| RF = 3 | 15,729,587 | 23,934,472 | 44 |
| RF = 4 | 16,244,507 | 24,503,431 | 43 |

The Impr columns show percentage improvement of a first run in comparison to a second run.

The conclusion is that PIXSAR adjusts well to drastically changing the workload. In the future we intend to examine the case of a slowly changing workload.

General

In the present disclosure we present the PIXSAR algorithm, a workload-directed algorithm for incrementally adjusting XML document placement on disk. In this framework, node weights express storage requirement and edge weights represent the likelihood of co-residing in cache. The problem as a whole is cast as an augmented (with sibling edges) tree partitioning problem.

We construct an end-to-end experimental data clustering system that includes a disk and File System simulator for storing native XML data. A method is provided for exporting the Saxon query processor into the PIXAR environment.

The method allows us to run arbitrary XPath queries on our system. We also devise methods for recording access patterns, express them as edge weights, and efficiently trigger when the file organization becomes deficient.

PIXSAR can be used with varying parameters, which influence memory and runtime costs on the one hand, and the quality of data placement which affects the amount of page faults, on the other hand.

Extensive experimental evaluation demonstrates that the PIXSAR algorithm performs well in practice—it often provides nearly 20% (in some cases even more than 40%) improvement over the DFS algorithm in terms of the number of page faults. PIXSAR flexibility and efficiency makes it a good candidate to be used in workload-directed, off-line or online, incremental clustering of XML documents.

Work may be performed on a single disk and using other storage settings, and using a physical disk. A mechanism may express an affinity between nodes that are not connected via an edge, a situation that occurs, for example, when indexes are used. It is further possible to provide a concurrency control mechanism to enable concurrent query processing and reclustering.

Lukes' Algorithm

XS, which is used by PIXSAR, is based on Lukes' algorithm. In the following, we present a short overview of Lukes' algorithm to complete the disclosure. Consider a rooted tree T=(V,E), where V is a set of nodes and $E \subset V \times V$ is a set of edges. A cluster over T is a non-empty subset of V. When no confusion arises, we simply use the term cluster. A partition of T, $P^T$, is a set of pair-wise disjoint clusters over T whose union equals V, that is $PT=\{c_1; \ldots ; c_k\}$, $k \geq 1$, such that $\cup_{i=1}^{k} c_i=V'$, and $c_i \cap c_j=\emptyset$, for all $i \neq j$.

Each node i of T has a weight value (which is the size of the node data), $w_i$. Each edge (I, j) also has q value that represents the importance of the edge, $v_{ij}$. The size of a cluster c, is size(c)=$\Sigma i \in c\ W_i$. The value of a cluster c, is value(c)= $\Sigma_{(i,j) \in E \wedge i \in c \wedge j \in c}\ v_{ij}$. The value of a partition $P^T$, is value $(P^T)=\Sigma_{c \in P^T}$ value(c).

The cost of a partition $P^T$ can be defined in two ways:
1. cost($P^T$) is the sum of the values of all edges of T minus value($P^T$), namely the total value of inter-cluster edges.
2. cutValue($P^T$), namely the total value of outer-cluster edges. The lower the cost is, the better the partition.

Let W, the cluster weight bound, be a positive integer. The tree partitioning problem is formulated as follows: Find a highest value partition, $P_{opt}^T$, among all the possible partitions of T, such that the size of no cluster in $P_{opt}^T$ exceeds W. $P_{opt}^T$ is said to be an optimal partition. So, $P_{opt}^T=\{c_1; \ldots ; c_k\}$ such that size($c_i$)$\leq$W, for i=1; : : : ; k, and value($P_{opt}^T$)=Max{value($P^T$)|$P^T$ is a partition of T and $\forall c \in P^T$, size(c)$\leq$Wg.

Lukes' algorithm solves the tree partitioning problem. It operates on a tree in a bottom-up manner; it processes a node only after all the node's children have been processed. Consider a partition $P^{T'}$ of a subtree T' of T rooted at node x.

The unique cluster in $P^{T'}$ which contains x is called the pivot cluster of $P^{T'}$. Lukes' uses dynamic programming as follows:

For each subtree, say rooted at a node x, and for each feasible total cluster size U (i.e., $w_x \leq U \leq W$), it constructs, if possible, an optimal subtree partition in which the pivot cluster is of size U. So, Lukes' algorithm associates a set of partitions with node x, each optimal under the constraint that the pivot cluster size is U. When considering node x, the algorithm partitions that are associated with each child node of x, are used to update the collection of partitions, one per each feasible total cluster size, for x. Once the tree root node is processed, the final result, $P_{opt}^T$, is the highest value partition associated with the root; as Lukes showed, $P_{opt}^T$ has the maximum partition value among all possible partitions of the tree.

Figure 7:
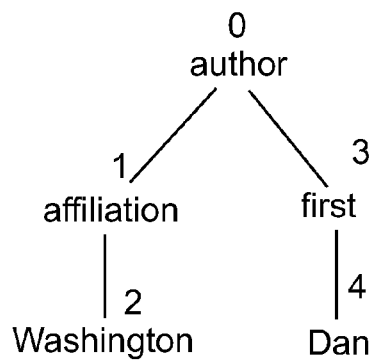
FIGS. 7(a) to 7(d) are an XML tree, a clustering tree and partitions obtained using different parameters.
Figure 7:
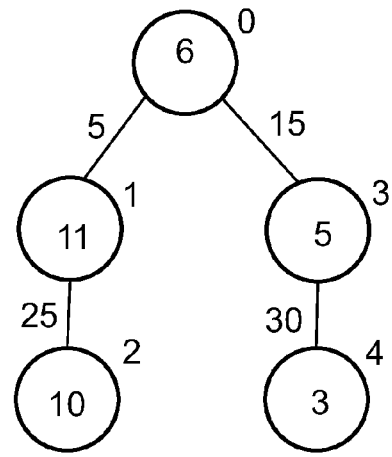
Figure 7:
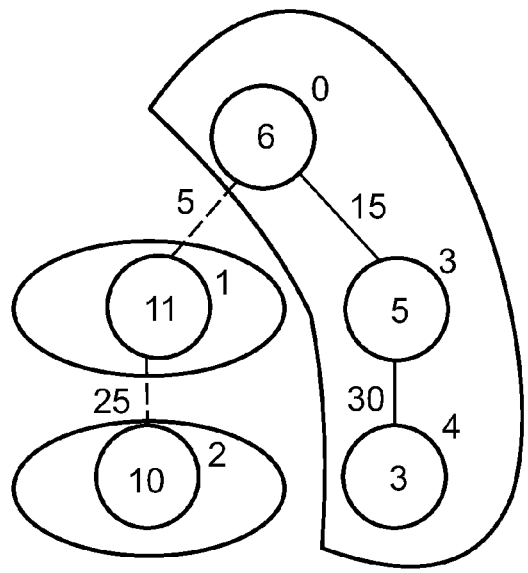
Figure 7:
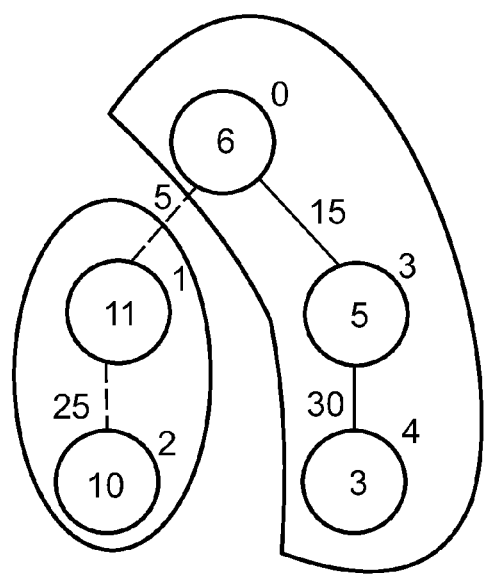

To illustrate the Lukes' algorithm, we consider the XML tree (T) displayed in FIG. 7(a), wherein the bold numbers denote nodes. FIG. 7(b) presents the corresponding clustering tree (T') in which for simplicity node weights (inside the circles) are the text sizes of the corresponding XML nodes, and the edge weights (next to the edges) model navigational behavior.

FIGS. 7(c) and (d) illustrate the clusterings corresponding to cluster weight bounds of 20 and 25, respectively.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

In the following claims, the terms rearranging and reclustering, with respect to grouping of the nodes on pages, are intended to be synonymous.

What is claimed is:

1. In a data storage and retrieval system wherein tree structured data is arranged in nodes and is stored and retrieved in pages, each page comprising a collection of subtrees of nodes, a method implemented on an electronic processor, the method comprising:
   monitoring ongoing data retrieval of said tree structured data to find retrieval patterns of nodes which are retrieved in temporal proximity and to identify changes in said retrieval patterns over time; and
   periodically rearranging the data nodes among said pages dynamically during usage of the data to reflect said changes, so that nodes more often retrieved in temporal proximity are migrated to cluster together and nodes more often required in temporal separation are migrated to cluster separately, thereby to keep small an overall number of page accesses of said data storage and retrieval system during data retrieval despite dynamic changes in patterns of data retrieval, said periodically rearranging being triggered according to pages.

2. The method of claim 1, wherein said monitoring comprises:
   defining edges between pairs of nodes;
   assigning weightings to said edges and incrementing said weighting when respective nodes are retrieved together within said temporal proximity.

3. The method of claim 1, wherein:
   said periodically rearranging is triggered for individual pages where weightings have changed beyond a threshold amount, thereby providing identified pages; and
   rearranging nodes in pages within a radius of said identified pages within said data storage and retrieval system by rearranging nodes in said pages so as to maximize edge weightings within said pages and minimize weightings between said pages.

4. The method of claim 2, wherein said edges comprise internal edges and external edges, internal edges being edges between two nodes currently belonging to the same page and external edges being edges between two nodes currently belonging to different pages, the method comprising triggering said rearranging when one or more external edges obtain a relative increase in weighting, or when one or more internal edges obtain a relative decrease in weighting.

5. The method of claim 4, further comprising providing the following counters for pages to facilitate operation:
   IIC—an Internal Incremental weight Counter,
   EIC—an External Incremental weight Counter,
   IPC—an Internal Preliminary weight Counter,
   EPC—an External Preliminary weight Counter,
   GPC—a Global Preliminary weight Counter sampled at two different times to give a first $GPC_{OLD}$ value and a second later $GPC_{NEW}$ value, and
   TRF—a predetermined Triggering Rearranging Factor; and
   using said counters to trigger rearrangement when either:
   the sum of IIC+IPC as a proportion of $GPC_{NEW}$ is smaller by at least TRF in comparison to IPC as a proportion of $GPC_{OLD}$; or
   the sum of EIC+EPC as a proportion of $GPC_{NEW}$ is bigger by at least TRF in comparison to EPC as a proportion of $GPC_{OLD}$.

6. The method of claim 5, further comprising embedding said counters within said pages.

7. The method of claim 1, being carried out concurrently with data access.

8. The method of claim 1, wherein said data arranged in nodes comprises an XML file arranged as a tree with an XML root being the tree root and further comprising edges between adjacent sibling nodes.

9. The method of claim 5, further comprising adjusting the sensitivity of dynamic rearranging by changing the value of TRF.

10. The method of claim 1, wherein two nodes are considered for arranging together if their size is such that they are able to fit together on a single page.

11. A data storage and retrieval system wherein tree-structured data is arranged in nodes and is stored and retrieved in pages, each page comprising a plurality of nodes, the system implemented using an electronic processor, the system comprising:
   a monitoring means for monitoring ongoing data retrieval of said tree data to find retrieval patterns of nodes which are retrieved in temporal proximity and to identify changes in said retrieval patterns over time; and
   a node rearranging means for periodically rearranging the data nodes among said pages dynamically during usage of the data to reflect said changes in data usage so that nodes more often retrieved together in temporal proximity are migrated to cluster on shared pages and nodes more often required separately are migrated towards separate pages, thereby to keep small an overall number of page accesses during data retrieval despite dynamic changes in patterns of data retrieval, said periodically rearranging being triggered according to pages.

12. The data storage and retrieval system of claim 11, wherein the node rearranging unit comprises:
   an edge definer for defining edges between pairs of nodes; and
   a weighting unit associated with said edge definer, for assigning weightings to said edges and incrementing said weighting when respective nodes are retrieved together within a predetermined proximity
   the monitoring unit comprises a rearranging triggering unit for periodically checking for pages where weightings have changed beyond a threshold amount relative to other pages
   the triggering unit thereby triggering said rearranging unit to recluster nodes within a certain radius of said pages within said data storage and retrieval system by migrating said nodes whose associated edge weightings have changed so as to maximize weightings within said pages and minimize weightings between said pages.

13. The system of claim 12, wherein said edges comprise internal edges and external edges, internal edges being edges between two nodes currently belonging to the same page and external edges being edges between two nodes currently belonging to different pages, the rearranging triggering unit being configured to trigger said rearranging when an external edge obtains a relative increase in weighting, or when an internal edge obtains a relative decrease in weighting.

14. The system of claim 11, wherein said pages are arranged with counters, the counters comprising:
   IIC—an Internal Incremental weight Counter,
   EIC—an External Incremental weight Counter,
   IPC—an Internal Preliminary weight Counter,
   EPC—an External Preliminary weight Counter,
   GPC—a Global Preliminary Counter sampled at two different times to give a first $GPC_{OLD}$ value and a second later $GPC_{NEW}$ value, and
   TRF—a predetermined Triggering Rearranging Factor.

15. The system of claim 14, wherein said rearranging triggering unit is configured to trigger rearranging about a given page when either:
   the sum of IIC+IPC as a proportion of $GPC_{NEW}$ is smaller by at least TRF in comparison to IPC as a proportion of $GPC_{OLD}$; or
   the sum of EIC+EPC as a proportion of $GPC_{NEW}$ is bigger by at least TRF in comparison to EPC as a proportion of $GPC_{OLD}$.

16. The system of claim 11, wherein said rearranging is carried out concurrently with data access.

17. The system of claim 11, wherein said data arranged in nodes comprises an XML file arranged as a tree wherein an XML root comprises a tree root and further comprising edges between adjacent sibling nodes.

18. The system of claim 14, wherein said rearranging triggering unit further comprises adjustment control for adjusting the sensitivity of dynamic rearranging by changing the value of TRF.

* * * * *